July 28, 1953

E. L. MARTIN 2,647,052

PHOTOGRAPHIC SILVER HALIDE EMULSION CONTAINING
SYMMETRICAL CARBOCYANINE DYES
Filed Feb. 20, 1951

FIG.1.

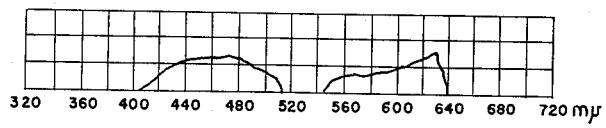

Gelatin Silver Iodobromide Emulsion
Containing Dye of Example I.
(3:3'-diethyl-5:5'-dicarbomethoxy
thiacarbocyanine ethosulfate

FIG.2.

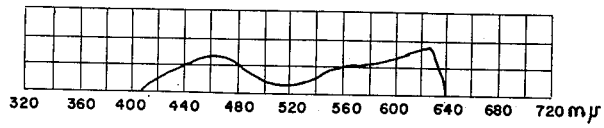

Gelatin Silver Iodobromide Emulsion
Containing Dye of Example II.
(3:3'-diethyl-5:5'-dicarbomethoxy-9-
methyl thiacarbocyanine ethosulfate

INVENTOR

ELMORE LEWIS MARTIN

BY *Lynn Barratt Morris*

ATTORNEY

Patented July 28, 1953

2,647,052

UNITED STATES PATENT OFFICE 2,647,052

PHOTOGRAPHIC SILVER HALIDE EMULSION CONTAINING SYMMETRICAL CARBOCYANINE DYES

Elmore Louis Martin, Wilmington, Del., assignor to E. I. du Pont de Nemours and Company, Wilmington, Del., a corporation of Delaware Application February 20, 1951, Serial No. 211,967

5 Claims. (Cl. 95—7)

This invention relates to new carbocyanine dyes. More particularly, it relates to symmetrical 5-carbalkoxy benzthiazole carbocyanine dyes and to their preparation. It also relates to photographic silver halide emulsions containing such dyes.

A very large number of cyanine dyes are known. Their properties differ a great deal due to their particular constitution and molecular configuration. Many of these dyes extend the sensitivity of colloid silver halide emulsions from their normal sensitivity in the blue region of the spectrum to the green, red and infrared regions of the spectrum. A few dyes extend the sensitivity of colloid silver halide emulsions from the blue region to the red region of the spectrum with no or substantially no sensitivity in the green region of the spectrum. The latter dyes are known as "green-blind" sensitizing dyes and they are useful in multi-layer photographic elements for color photography.

An object of this invention is to provide new carbocyanine dyes. A further object is to provide such dyes which confer an extra range of sensitivity to photographic silver halide emulsions. A still further object is to provide new "green-blind" carbocyanine dyes. Still other objects will be apparent from the following description of the invention.

The novel symmetrical carbocyanine dyes provided by this invention may be represented by the general formula:

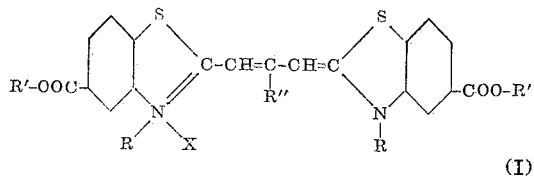

(I)

wherein R is an alkyl radical of 1 to 3 carbon atoms or a benzyl radical; R' is an alkyl radical of 1 to 4 carbon atoms; R" is a hydrogen atom or an alkyl radical of 1 to 3 carbon atoms and X is the negative radical of an acid, e. g., halogen, such as Cl, Br and I; perchlorate, —SCN, p-toluenesulfonate, methosulfate, ethosulfate, etc.

The dyes of Formula I can advantageously be made from a 2-methylbenzthiazole which contains a carbalkoxy substituent of 2 to 5 carbon atoms in the 5-position of the benzothiazole ring by (a) converting such a base into a cyclo ammonium or quaternary salt with a quaternizing or salt-forming agent such as an alkyl salt (viz., an ester of an alcohol radical with a suitable acid) e. g., an alkyl chloride, alkyl bromide, alkyl p-toluenesulfonate, benzyl chloride, benzyl bromide, alkyl sulfate, etc., and (b) condensing the quaternary salts with an orthoester of a monocarboxylic acid, e. g., methyl and ethyl orthoformate, orthoacetate, orthopropionate, etc. When the orthoformate esters are used R" in the above formula becomes a hydrogen atom and when orthoacetates and higher homologues are used R" becomes an alkyl radical. The salt forming-reaction and the cyanine dye condensations reaction can be carried out separately or at the same time if desired by mixing the 2-methyl-5-carbalkoxy benzothiazole base, the quaternary salt-forming compound and the orthoester.

The carbocyanine dyes of Formula I have been found to be quite useful photographic sensitizing dyes. When added to a colloid-silver halide emulsion they confer an extra range of sensitivity thereto in the red region of the spectrum with substantially no sensitivity in the green region of the spectrum. They constitute new "green-blind" sensitizing dyes. These dyes have the additional advantage that finished photographs are essentially free from residual stain. The dyes are not limited in their use to any particular type of light-sensitive silver halide emulsion but they may be incorporated in colloid-silver halide emulsions of various types including silver chloride, silver bromide, silver chlorobromide, silver iodobromide, simple and mixed emulsions. Various types of water-permeable or hydrophilic colloids can be used as the binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, polyvinyl acetals, etc., hydrophilic colloid color formers, e. g., polyvinyl acetals of color-forming aldehydes.

The preparation of a 2-methyl-5-carbalkoxy-benzothiazole useful in making new dyes will be exemplified in the following procedure for preparing one such base.

PREPARATION A

*2-methyl-5-carbomethoxybenzothiazole*

To a solution of 60 g. of sodium hydrosulfide in 250 ml. of methanol there was added 8 g. of sulfur, and the resulting solution was filtered to remove a small amount of insoluble material. The resulting solution of sodium disulfide was added dropwise over a period of 2.5 hours to a solution of 110 g. of methyl 4-chloro-3-nitrobenzoate in 250 ml. of methanol heated to reflux.

The methyl 3-nitro-benzoate-4-disulfide separated as a solid during the addition of the sodium disulfide. The mixture was cooled to about 20° C., filtered and the filter cake washed with a small amount of methanol. The filter cake was then stirred with warm water to remove the sodium chloride and air dried. This product was reduced with zinc dust and acetic anhydride, and after distillation under reduced pressure (B. P. 160°–165° C. at 1 mm.) was recrystallized from a mixture of benzene and petroleum ether to give colorless crystals of 2-methyl-5-carbomethoxy-benzothiazole melting at 96–98° C. The reaction takes place as follows:

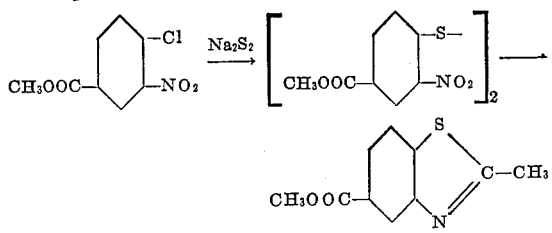

In the accompanying drawing Fig. 1 is a graph of a spectrogram of the dye of Example I in a gelatin silver iodobromide emulsion, and Fig. 2 is a graph of a spectrogram of the dye of Example II in a gelatin silver halide emulsion.

The preparation of certain symmetrical carbocyanine dyes of this invention are set forth in the following examples.

EXAMPLE I

In a suitable flask there were placed 2.07 g. of 5-carbomethoxy-2-methylbenzothiazole and 1.54 g. of diethyl sulfate. The mixture was heated together for three hours at 130° C. Twenty milliliters (20 ml.) of pyridine and 3 ml. of ethyl orthoformate were then added and the mixture was heated to reflux for 15 minutes. A deep purple color formed and the dye crystallized out of solution. The dye was filtered off and recrystallized from alcohol. The yield was 1.81 g. of sparkling purple crystals melting at 280°–282° C.

The dye had the structural formula:

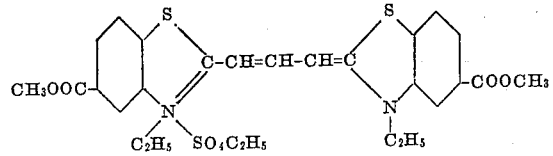

An ethanol solution of the dye (3:3'-diethyl-5:5'-dicarbomethoxy thiocarbocyanine ethosulfate sulfonate) had an absorption maximum at 555 millimicrons. When added to a negative type gelatino silver iodobromide emulsion it was found to confer an extra range of sensitivity in the red region of the spectrum extending from 550 to 645 millimicrons, with a maximum at 635 millimicrons. The emulsion was substantially free from sensitivity at 520 to 550 millimicrons.

EXAMPLE II

A dye similar to that described in Example I but containing a methyl substituent on the central carbon atom of the trimethine chain was made by substituting 3 milliliters of ethyl orthoacetate for the ethyl orthoformate of that example. The purple dye crystals had a melting point at 259–260° C. An ethanol solution of the dye (3:3'-diethyl - 5:5' - dicarbomethoxy - 9 - methyl thiacarbocyanine ethosulfate) was purple in color and had an absorption maximum at 548 millimicrons. When added to a negative type gelatino silver halide emulsion it was found to extend the sensitivity to 640 millimicrons with a peak at 625 millimicrons and a region of low sensitivity from 500 to 540 millimicrons.

Various other carbocyanine dyes containing different alkyl salt radicals than those described in the foregoing examples can be made in a similar manner by substituting for the diethyl sulfate other alkyl salts such as ethyl p-toluenesulfonate, methyl p-toluenesulfonate, ethyl iodide, methyl chloride and ethyl benzenesulfonate.

The ethyl ethosulfate quaternary salts of the foregoing examples can be converted into other quaternary salts by a metathetical reaction, e. g., into the corresponding bromide or iodide by the addition of sodium iodide, potassium bromide, ammonium chloride, potassium thiocyanate, etc.

Similarly, in place of the ethyl orthoformate, ethyl orthoacetate and ethyl orthopropionate of the above examples, there may be substituted other alkyl orthoesters of aliphatic monocarboxylic acids, e. g., methyl orthoformate, methyl orthoacetate and methyl orthopropionate.

Dyes containing two 5-carboethoxybenzothiazole or two 5-carbopropoxybenzothiazole groups can be made in like manner by substituting equivalent amounts of 5-carboethoxy-2-methylbenzothiazole or 5-carbopropoxy-2-methyl-benzothiazole for the 5-carbomethoxy-2-methylbenzothiazole of Examples I and II. These two bases can be made by the process given in procedure A above by substituting the appropriate holomogous nitrobenzoate ester. Different salt groups can be introduced into these dyes also as taught above.

This invention has the advantage that it provides the art with a new group of valuable photographic sensitizing dyes. These dyes do not evidence any significant sensitivity in the green region of the spectrum but confer an extra range of sensitivity to colloid silver halide emulsions in the red region of the spectrum. This is particularly advantageous in the practice of color photography, confining the recording of the red region of the spectrum to one layer of photographic emulsion. It is a remarkable property, since the corresponding dyes with hydrogens in the 5-position are not at all green-blind. An additional advantage, besides the fact that finished photographs made from emulsions containing these dyes do not exhibit significant residual stain, is the non-migratory property of the dyes, also an advantage in color photography.

As many widely different embodiments of this invention can be made without departing from the spirit and scope thereof, it is to be understood that the invention is not to be limited except as defined by the claims.

What is claimed is:

1. A colloid silver halide emulsion containing a dye having the general formula:

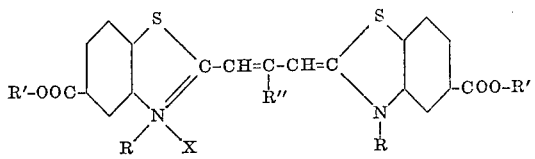

wherein R is a hydrocarbon radical taken from the group consisting of alkyl radicals of 1 to 3 carbon atoms and a benzyl radical; R' is an alkyl radical of 1 to 3 carbon atoms, R'' is a member taken from the group consisting of hydrogen and alkyl radicals of 1 to 3 carbon atoms and X is the negative radical of an acid.

2. A gelatino silver halide emulsion containing a dye having the general formula:

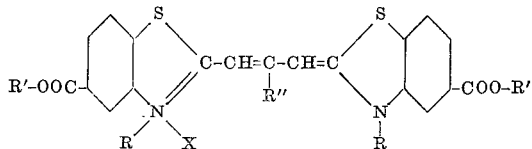

wherein R is a hydrocarbon radical taken from the group consisting of alkyl radicals of 1 to 3 carbon atoms and a benzyl radical; R' is an alkyl radical of 1 to 3 carbon atoms, R'' is a member taken from the group consisting of hydrogen and alkyl radicals of 1 to 3 carbon atoms and X is the negative radical of an acid.

3. A colloid silver halide emulsion containing a dye having the general formula:

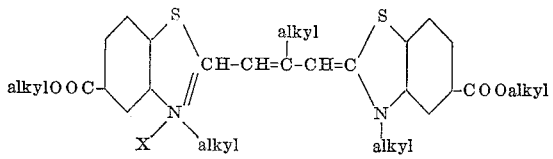

wherein alkyl contains 1 to 3 carbon atoms.

4. A colloid silver halide emulsion containing a dye having the formula:

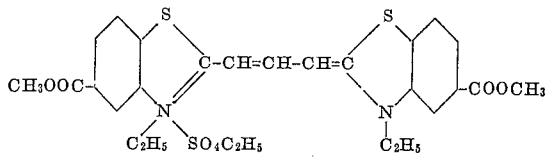

5. A colloid silver halide emulsion containing a dye having the formula:

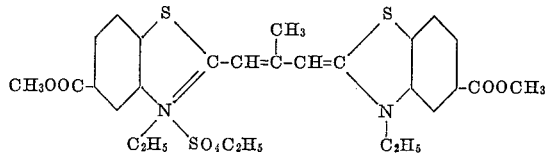

ELMORE LOUIS MARTIN.

References Cited in the file of this patent

UNITED STATES PATENTS

| Number | Name | Date |
| --- | --- | --- |
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chemical Abstracts, 16:3101 (Abstract of Brit. Med. Journal, 1922, I, 514–515).

Chemical Abstracts 19:530 (Abstract of Proc. Roy. Soc., London, 96 B, 317–333, 1924).